US008525893B2

(12) United States Patent
Ishida

(10) Patent No.: US 8,525,893 B2
(45) Date of Patent: Sep. 3, 2013

(54) IMAGE CAPTURING APPARATUS WITH DIFFERENT SHOOTING MODES AND IMAGE CAPTURING APPARATUS CONTROL METHOD THEREOF

(75) Inventor: Toshiki Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 514 days.

(21) Appl. No.: 12/362,524

(22) Filed: Jan. 30, 2009

(65) Prior Publication Data

US 2009/0213237 A1 Aug. 27, 2009

(30) Foreign Application Priority Data

Feb. 27, 2008 (JP) .................................. 2008-046897

(51) Int. Cl.
*H04N 5/225* (2006.01)

(52) U.S. Cl.
USPC ...................................................... 348/220.1

(58) Field of Classification Search
USPC ...................................................... 348/220.1
See application file for complete search history.

(56) References Cited

U.S. PATENT DOCUMENTS

| 2004/0119835 | A1* | 6/2004 | Okamura | 348/207.99 |
| 2004/0212714 | A1* | 10/2004 | Mikoshiba et al. | 348/333.11 |
| 2005/0168589 | A1* | 8/2005 | Silverstein et al. | 348/220.1 |
| 2005/0237422 | A1 | 10/2005 | Kido | |
| 2006/0264733 | A1 | 11/2006 | Masaki | |
| 2006/0268117 | A1* | 11/2006 | Loui et al. | 348/220.1 |
| 2007/0052811 | A1 | 3/2007 | Suzuki | |
| 2008/0084486 | A1* | 4/2008 | Enge et al. | 348/239 |

FOREIGN PATENT DOCUMENTS

| JP | 2001-352483 | | 12/2001 |
| JP | 2004-312276 | A | 11/2004 |
| JP | 2007-074032 | A | 3/2007 |
| JP | 2007-166486 | A | 6/2007 |

OTHER PUBLICATIONS

The above references were cited in a Mar. 8, 2010 Japanese Office Action, which is enclosed without English Translation, that issued in Japanese Patent Application No. 2008-046897.
The above references were cited in a Apr. 27, 2011 European Search Report which is enclosed of the counterpart European Patent Application No. 09152543.6.

* cited by examiner

*Primary Examiner* — Albert Cutler
(74) *Attorney, Agent, or Firm* — Cowan, Liebowitz & Latman, P.C.

(57) ABSTRACT

The system control unit executes the following control when switching the mode from the first mode to the second one. When the first accumulation period is shorter than the first readout period, the system control unit controls the image sensor driving circuit and readout circuit so that the sum of the first and second readout periods fits into a 2-frame period. When the first accumulation period is longer than the first readout period, the system control unit controls the image sensor driving circuit and readout circuit so that the sum of the first accumulation period and second readout period fits into a 2-frame period.

8 Claims, 6 Drawing Sheets

IMAGE CAPTURING APPARATUS WITH DIFFERENT SHOOTING MODES AND IMAGE CAPTURING APPARATUS CONTROL METHOD THEREOF

BACKGROUND OF THE INVENTION

1. Field of the Invention

The present invention relates to an image capturing apparatus and image capturing apparatus control method.

2. Description of the Related Art

Some image capturing apparatuses such as digital cameras and digital video cameras have both a function of performing moving image shooting and a function of performing still image shooting. In the image sensing apparatus, an image sensor such as a CCD sensor or CMOS sensor includes a pixel array in which a plurality of pixels including photoelectric conversion units are arrayed in the row and column directions, and a readout circuit for reading out a signal from the pixel array.

According to a technique disclosed in Japanese Patent Laid-Open No. 2001-352483, an image capturing apparatus switches the readout circuit driving method between successive frame periods from the first driving method suitable for moving image shooting to the second driving method suitable for still image shooting. According to the first driving method, the readout circuit is driven to read out signals from the pixel array at a low pixel density suitable for moving image shooting. According to the second driving method, the readout circuit is driven to read out signals from the pixel array at a high pixel density suitable for still image shooting. According to Japanese Patent Laid-Open No. 2001-352483, continuous shooting between moving image shooting and still image shooting can be achieved.

The technique in Japanese Patent Laid-Open No. 2001-352483 is premised on that no moving image shooting is performed during still image shooting.

However, some image capturing apparatuses provide a mode (to be referred to as a first mode hereinafter) in which only moving image shooting is performed, and a mode (to be referred to as a second mode hereinafter) in which parallel shooting of still and moving images is performedmoving image shooting.

In the first mode, the image capturing apparatus performs an operation suitable for moving image shooting. More specifically, the image capturing apparatus drives the readout circuit to read out signals from the pixel array at a pixel density decreased by addition, decimation, extraction, or the like, so as to read out signals in a readout period shorter than a frame period suitable for moving image shooting.

In the second mode, the image capturing apparatus performs an operation which gives priority to still image shooting. More specifically, the image capturing apparatus drives the readout circuit to read out signals in a readout period longer than a frame period suitable for moving image shooting, so as to read out signals from the pixel array at a high pixel density suitable for still image shooting. Also, the image capturing apparatus controls each pixel of the pixel array to accumulate a signal in an accumulation period shorter than one suitable for moving image shooting so that each pixel of the pixel array accumulates a signal at a shutter speed, i.e., in an accumulation period suitable for still image shooting. In still image shooting, the shutter speed, i.e., accumulation period needs to be set shorter than an accumulation period (accumulation period in the first mode) suitable for moving image shooting in order to prevent blurring of an image upon the movement of an object.

In the image capturing apparatus, the mode of the image capturing apparatus is sometimes switched from the first mode to the second mode between successive frames. In this case, if the image capturing apparatus maintains a frame rate suitable for moving image shooting, the readout period in the second mode becomes longer than a 1-frame period, and a drop frame of an obtained moving image may occur.

For example, as shown in FIG. 6, the image capturing apparatus keeps the lengths of frame periods FT1 to FT9 constant to achieve a frame rate suitable for moving image shooting regardless of the mode. The image capturing apparatus switches from the first mode to the second mode between the frame periods FT1 and FT2. The image capturing apparatus switches from the second mode to the first mode between the frame periods FT2 and FT3. The image capturing apparatus switches from the first mode to the second mode between the frame periods FT3 and FT4. The image capturing apparatus switches from the second mode to the first mode between the frame periods FT4 and FT5.

In FIG. 6, VD represents a frame sync signal (pulse), and is generated at an interval of 1/60 sec for an NTSC standard signal. The readout operation, moving image generation operation, and still image generation operation start at timings synchronized with the frame sync signal VD.

A, C, E, F, G, H, and I represent signals for moving images, and B and D represent signals for still images. First accumulation periods Tsa_A, Tsa_C, Tsa_E, Tsa_F, Tsa_G, Tsa_H, and Tsa_I in which the photoelectric conversion unit executes an accumulation operation in the first mode are fixed to 1/60 sec. Second accumulation periods Tsa_B and Tsa_D in which the photoelectric conversion unit executes an accumulation operation in the second mode are shorter than the first accumulation period and are shorter than 1/60 sec.

First readout periods Tsr_A, Tsr_F, Tsr_G, Tsr_H, and Tsr_I in which the readout circuit executes a readout operation in the first mode are shorter than 1/60 sec in accordance with the readout clock rate and the number of output channels. The first readout period is shorter than each of the frame periods FT1 to FT9. Second readout periods Tsr_B and Tsr_D in which the readout circuit executes a readout operation in the second mode are longer than the frame periods FT1 to FT9. Since the second readout periods Tsr_B and Tsr_D are longer than the frame periods FT1 to FT9, the readout circuit cannot start the readout operations of the signals C and E at timings synchronized with the frame sync signal VD.

In the moving image generation operation, the signals A, B, D, F, G, and H are used to generate image signals for 1-frame moving image (Tmv_A, Tmv_B, Tmv_D, Tmv_F, Tmv_G, and Tmv_H). As described above, the readout circuit cannot perform the readout operations of the signals C and E, so image signals for moving images corresponding to the signals C and E cannot be generated. As a result, drop frame of frames corresponding to the signals C and E would occur.

In the still image generation operation, the signals B and D are used to generate image signals for 1-frame still images.

SUMMARY OF THE INVENTION

It is a first aim of the present invention to obtain a high-resolution still image and prevent drop frame of an obtained moving image even when parallel shooting of still and moving images is performedmoving image shooting.

It is a second aim of the present invention to obtain a moving image with proper exposure and to prevent drop frame of an obtained moving image even when an accumulation period starting within a preceding frame period completes the next frame period.

According to the first aspect of the present invention, there is provided an image capturing apparatus comprising: a pixel array in which a plurality of pixels each including a photoelectric conversion unit are arrayed in a row direction and a column direction; a driving unit which drives the photoelectric conversion unit of each pixel of the pixel array to accumulate a signal in a first accumulation period in a first mode, and to accumulate a signal in a second accumulation period shorter than the first accumulation period in a second mode; a readout unit which reads out a first image signal from the pixel array in a first readout period shorter than a predetermined 1-frame period, and reads out a second image signal from the pixel array in a second readout period longer than the 1-frame period; and a control unit which, when switching a mode from the first mode to the second mode, controls the readout unit to start a readout operation of the second image signal within a frame period in which the first image signal is read out.

According to the second aspect of the present invention, there is provided an image capturing apparatus comprising: a pixel array in which a plurality of pixels each including photoelectric conversion unit are arrayed in a row direction and a column direction; a driving unit which drives the photoelectric conversion unit of each pixel of the pixel array to accumulate a signal in an accumulation period; a readout unit which reads out an image signal from the pixel array; a control unit which, when a first accumulation period of an image signal starting within a first frame period completes in a second frame period which is next to the first frame period, controls the driving unit to make a second accumulation period of an image signal staring after the completion of the first accumulation period shorter than the first frame period such that the second accumulation period completes within the second frame period; and an amplification unit which amplifies the image signal to obtain an image with proper exposure according to a length of an accumulation period.

According to the third aspect of the present invention, there is provided a method of controlling an image capturing apparatus having a pixel array in which a plurality of pixels each including a photoelectric conversion unit are arrayed in a row direction and a column direction, the method comprises: a driving step of driving the photoelectric conversion unit of each pixel of the pixel array to accumulate a signal in a first accumulation period in a first mode, and to accumulate a signal in a second accumulation period shorter than the first accumulation period in a second mode; a readout step of reading out a first image signal from the pixel array in a first readout period shorter than a predetermined 1-frame period, and reading out a second image signal from the pixel array in a second readout period longer than the 1-frame period; and a control step of, when switching a mode from the first mode to the second mode, controlling a operation in the readout step to start a readout operation of the second image signal within the frame period within a frame period in which the first image signal is read out.

According to the fourth aspect of the present invention, there is provided a method of controlling an image capturing apparatus having a pixel array in which a plurality of pixels each including photoelectric conversion unit are arrayed in a row direction and a column direction, a driving unit which drives the photoelectric conversion unit of each pixel of the pixel array to accumulate a signal in an accumulation period, and a readout unit which reads out an image signal from the pixel array, the method comprises: a control step of, when a first accumulation period of an image signal starting within a first frame period completes in a second frame period which is next to the first frame period, controlling the driving unit to make a second accumulation period of an image signal staring after the completion of the first accumulation period shorter than the first frame period such that the second accumulation period completes within the second frame period; and an amplification step of amplifying the image signal to obtain an image with proper exposure according to a length of an accumulation period.

The present invention can obtain a high-resolution still image and prevent drop frame of an obtained moving image even when parallel shooting of still and moving images is performedmoving image shooting.

The present invention can obtain a moving image with proper exposure and prevent drop frame of an obtained moving image even when an accumulation period starting within a preceding frame period completes the next frame period.

Further features of the present invention will become apparent from the following description of exemplary embodiments with reference to the attached drawings.

DESCRIPTION OF THE EMBODIMENTS

The present invention is directed to an operation of an image capturing apparatus having an image sensor when parallel-shooting of still and moving images is performed. The image capturing apparatus is, e.g., a digital camera or digital video camera having a function of the parallel shooting. The image sensor is, e.g., a CCD image sensor or CMOS image sensor.

Figure 1:
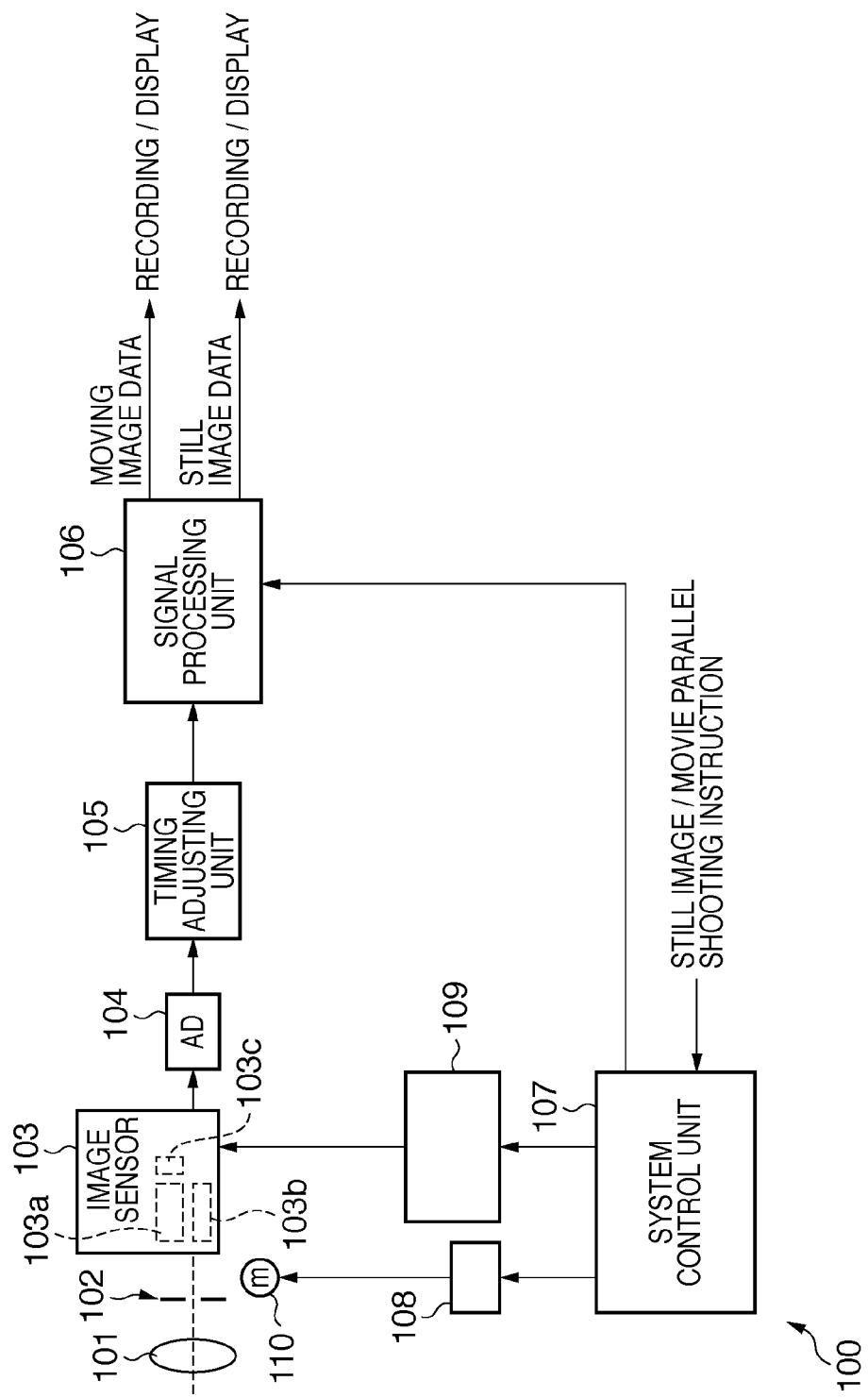
FIG. 1 is a block diagram of the arrangement of an image capturing apparatus 100 according to the first embodiment of the present invention.

An image capturing apparatus 100 according to the first embodiment of the present invention will be explained with reference to FIG. 1. FIG. 1 is a block diagram of the arrangement of the image capturing apparatus 100 according to the first embodiment of the present invention.

The image capturing apparatus 100 has the first and second modes. In the first mode, only moving image shooting is performed. In the second mode, parallel shooting of still and moving images is performedmoving image shooting.

A lens 101 forms the optical image of an object on the image sensing plane (a pixel array 103a) of an image sensor 103. At this time, an iris 102 adjusts the quantity of light guided from the lens 101 to the image sensor 103.

The image sensor 103 photoelectrically converts an optical image to generate an image signal, and outputs the generated image signal to an A/D converter 104. The image sensor 103 includes the pixel array 103a, a readout circuit 103b, and an output circuit 103c.

In the pixel array 103a, a plurality of pixels (not shown) including photoelectric conversion units (not shown) are arrayed two-dimensionally (in the row and column directions). The photoelectric conversion unit performs an accumulation operation to accumulate a signal in a predetermined accumulation period. The photoelectric conversion unit is, e.g., a photodiode. In the first mode, the photoelectric conversion unit accumulates a signal in the first accumulation period. In the second mode, the photoelectric conversion unit accumulates a signal in the second accumulation period shorter than the first accumulation period.

In a predetermined mode, the readout circuit 103b performs a readout operation to read out an image signal at a predetermined pixel density from the pixel array in a predetermined readout period. For example, in the first mode, the readout circuit 103b reads out the first image signal at the first pixel density from the pixel array in the first readout period shorter than a predetermined 1-frame period. For example, in the second mode, the readout circuit 103b reads out the second image signal at the second pixel density higher than the first pixel density from the pixel array in the second readout period longer than the 1-frame period. The readout circuit 103b supplies an image signal to the output circuit 103c.

The output circuit 103c amplifies an image signal to output the amplified image signal to a subsequent stage (the A/D converter 104).

The A/D converter 104 A/D-converts an image signal (analog signal) received from the image sensor 103 to generate an image signal (digital signal), and outputs converted image signals (first and second image signals) to a timing adjusting unit 105. The timing adjusting unit 105 corrects the image signals to signals of timings synchronized with the frame period, and outputs the corrected image signals (first and second image signals) to a signal processing unit 106.

The signal processing unit (generation unit) 106 performs a moving image generation operation to perform moving image signal processing for the first image signal and generate an image signal (first image signal) for a moving image. Also, the signal processing unit 106 performs a still image generation operation to perform still image signal processing for the second image signal and generate an image signal (second image signal) for a still image. The signal processing unit 106 executes at least one of the moving image generation operation and still image generation operation in accordance with the mode.

For example, the signal processing unit 106 amplifies the first image signal of one frame read out by the readout circuit in the first readout period in the first mode. By using the amplified first image signal, the signal processing unit 106 generates the first image signal of one frame during the operation in the first mode. The signal processing unit 106 generates the second image signal of one frame during the operation in the second mode by using the second image signal of one frame read out by the readout circuit during the second readout period in the second mode. In this manner, the signal processing unit 106 executes the moving image generation operation to perform moving image signal processing for the first or second image signal and generate an image signal (first image signal) for a moving image.

The signal processing unit 106 outputs generated image signals for a moving image and/or still image as recording/display image data (moving image data and/or still image data). The moving image signal processing includes processing to amplify an image signal for a moving image by a predetermined gain (amplification factor). The still image signal processing includes processing to amplify an image signal for a still image by a predetermined gain.

An iris motor 110 drives the iris 102. An iris driving circuit 108 drives the iris motor 110.

A system control unit 107 receives an instruction from the user via an input unit (not shown) to designate a mode. The system control unit 107 controls each unit in accordance with the designated mode. For example, upon accepting a still/moving image parallel shooting instruction, the system control unit 107 determines that the second mode is designated, and switches the mode from the first mode to the second one.

In accordance with the mode, the system control unit 107 determines the opening rate of the iris 102 and a gain used to amplify an image signal for a moving image by the signal processing unit 106 so as to obtain an image with proper exposure value. The system control unit 107 generates a control signal corresponding to the determined opening rate, and supplies it to the iris driving circuit 108. The system control unit 107 generates a control signal corresponding to the determined gain, and supplies it to the signal processing unit 106.

For example, when switching the mode of the image capturing apparatus from the first mode to the second mode and then switching it back to the first mode, the system control unit 107 determines, as the third accumulation period, a period in which the photoelectric conversion unit accumulates a signal in the switched-back first mode. The system control unit 107 determines the third accumulation period so as to be shorter than the first accumulation period and shorter than the 1-frame period. The third accumulation period may also be longer than the second accumulation period. The system control unit 107 generates a control signal corresponding to the determined third accumulation period, and supplies it to an image sensor driving circuit 109 to control the image sensor driving circuit 109. In accordance with the determined third accumulation period, the system control unit 107 determines a gain (amplification factor) used when the signal processing unit 106 amplifies the first image signal, so as to obtain an image with proper exposure value. The system control unit 107 generates a control signal corresponding to the determined gain, and supplies it to the signal processing unit 106 to control the signal processing unit 106.

In accordance with the mode, the system control unit 107 determines an accumulation period in which the photoelectric conversion unit performs an accumulation operation, and a readout period in which the readout circuit 103b performs a readout operation. The system control unit 107 generates control signals corresponding to the determined accumulation period and readout period, and supplies them to the image sensor driving circuit 109.

For example, when switching the mode from the first mode to the second mode, the system control unit 107 controls the image sensor driving circuit 109, and the readout circuit to start the second readout period within a frame period in which the image capturing apparatus operates in the first mode.

More specifically, the system control unit 107 executes the following control when switching the mode from the first mode to the second mode. When the second accumulation period is equal to or shorter than the first readout period, the system control unit 107 controls the image sensor driving circuit 109 and the readout circuit so that the sum of the first and second readout periods fits into a 2-frame period. When the second accumulation period is longer than the first readout period, the system control unit 107 controls the image sensor driving circuit 109 and the readout circuit so that the sum of the second accumulation period and second readout period fits into a 2-frame period.

Alternatively, the system control unit 107 executes the following control when switching the mode from the first mode to the second mode, and switching it back to the first mode. When the second accumulation period is equal to or shorter than the first readout period, the system control unit 107 controls the image sensor driving circuit 109 and the readout circuit so that the sum of the first readout period, second readout period, and the next first readout period fits into a 3-frame period. When the second accumulation period is longer than the first readout period, the system control unit 107 controls the image sensor driving circuit 109 and the readout circuit so that the sum of the second accumulation period, second readout period, and the next first readout period fits into a 3-frame period.

In accordance with a supplied control signal, the image sensor driving circuit 109 controls the accumulation operation of the photoelectric conversion unit and the readout operation of the readout circuit 103b.

For example, the image sensor driving circuit 109 drives each pixel of the pixel array 103a so that the photoelectric conversion unit accumulates a signal in the first accumulation period in the first mode, and accumulates a signal in the second accumulation period shorter than the first accumulation period in the second mode. In this way, the image sensor driving circuit 109 controls the accumulation operation of the photoelectric conversion unit. In addition, the image sensor driving circuit 109 controls the readout circuit to read out the first image signal at the first pixel density from the pixel array in the first readout period shorter than the 1-frame period in the first mode. The image sensor driving circuit 109 controls the readout circuit to read out the second image signal at the second pixel density higher than the first pixel density from the pixel array in the second readout period longer than the 1-frame period in the second mode.

Figure 2:
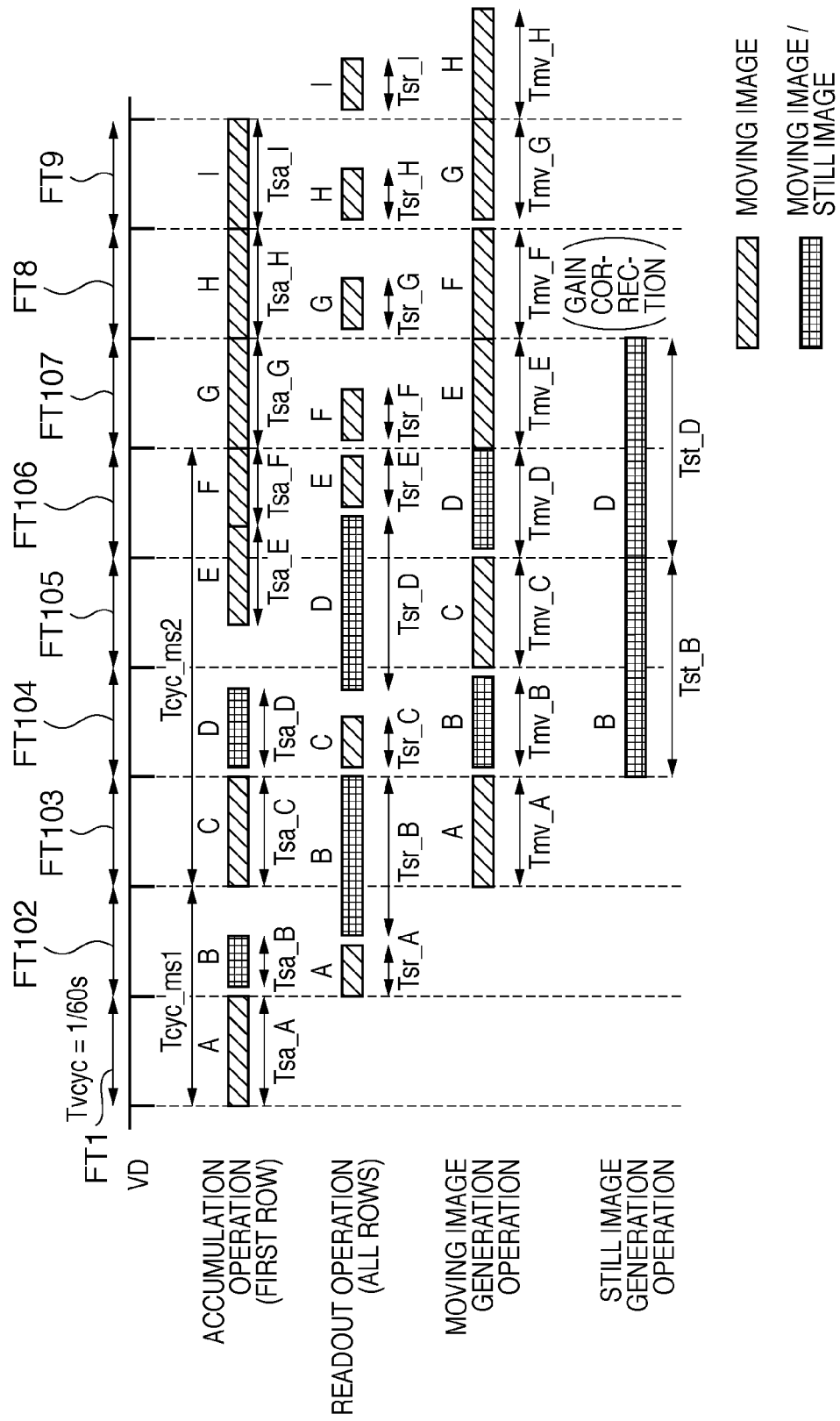
FIG. 2 is a timing chart showing the timings of an accumulation operation, readout operation, moving image generation operation, and still image generation operation in the image capturing apparatus 100 according to the first embodiment of the present invention.

The operation of the image capturing apparatus 100 will be explained with reference to FIG. 2. FIG. 2 is a timing chart showing the timings of an accumulation operation, readout operation, moving image generation operation, and still image generation operation in the image capturing apparatus 100.

As shown in FIG. 2, the image capturing apparatus 100 keeps the lengths of frame periods FT1 to FT9 constant to achieve a frame rate suitable for moving image shooting regardless of the mode. The image capturing apparatus 100 switches from the first mode to the second mode between the frame periods FT1 and FT102. In the first mode, only moving image shooting is performed. In the second mode, parallel shooting of still and moving images is performedmoving image shooting. The image capturing apparatus 100 switches from the second mode to the first mode between the frame periods FT102 and FT103. In other words, the image capturing apparatus 100 switches from the first mode to the second mode and then switches back to the first mode between the frame periods FT1 to FT103. The image capturing apparatus 100 switches from the first mode to the second mode between the frame periods FT103 and FT104. The image capturing apparatus 100 switches from the second mode to the first mode between the frame periods FT104 and FT105. In other words, the image capturing apparatus 100 switches from the first mode to the second mode and then switches back to the first mode between the frame periods FT103 to FT105.

In FIG. 2, VD represents a frame sync signal (pulse), and is generated at an interval of 1/60 sec (Tvcyc) for an NTSC standard signal. The readout operation, moving image generation operation, and still image generation operation start at timings synchronized with the frame sync signal VD.

A, C, E, F, G, H, and I represent image signals (first image signals) for moving images, and B and D represent image signals (second image signals) for still images.

The image sensor 103 executes a slit rolling shutter operation. More specifically, the image sensor 103 performs the following operation.

The photoelectric conversion units of pixels on the first to $N^{th}$ (N is an integer) rows in the pixel array sequentially start a signal accumulation operation. An "accumulation operation (first row)" shown in FIG. 2 represents an accumulation period in which the photoelectric conversion units of pixels on the first row perform an accumulation operation as a representative accumulation operation of the photoelectric conversion units of pixels on respective rows. The accumulation operations of the photoelectric conversion units of pixels on the remaining second to $N^{th}$ rows start sequentially after the start timing of the accumulation operation of the photoelectric conversion units of pixels on the first row. The accumulation operations of the photoelectric conversion units of pixels on a plurality of rows are parallel-executed in the accumulation period having the same length as that for the first row (see FIG. 5).

The readout circuit sequentially reads out signals from pixels on the first to $N^{th}$ rows so as to read out signals from a pixel on each row at timing which is later than the start timing of accumulation operation by a predetermined accumulation period of a photoelectric conversion unit of the pixel on each row (see FIG. 5). A "readout operation (all rows)" shown in FIG. 2 represents a readout period, from when signals are read out from pixels on the first row, until signals are read out from pixels on the final row ($N^{th}$ row). That is, the "readout operation (all rows)" represents a readout period in which the readout circuit performs a readout operation.

The signal processing unit 106 executes signal processing for an image signal received from the image sensor 103 via the A/D converter 104 and timing adjusting unit 105. More specifically, the signal processing unit 106 performs the following processing.

The signal processing unit 106 executes a moving image generation operation to perform moving image signal processing for the first image signal (or second image signal) and generate an image signal for a moving image. A "moving image generation operation" represents a period in which the signal processing unit 106 performs the moving image generation operation.

The signal processing unit 106 executes a still image generation operation to perform still image signal processing for the second image signal and generate an image signal for a still image. A "still image generation operation" represents a period in which the signal processing unit 106 performs the still image generation operation.

The signal (first image signal) A is accumulated in a photoelectric conversion unit of each pixel on each row in the first accumulation period Tsa_A of 1/60 sec. The signal A is read out from the pixel array in the first readout period Tsr_A, and output as moving image data in a period Tmv_A starting from a timing synchronized with the frame period.

The signal (second image signal) B is a signal of a still/moving image parallel shooting frame. The signal B is accumulated in a photoelectric conversion unit of each pixel on each row in the second accumulation period Tsa_B of less than 1/60 sec. The second accumulation period of the signal B starts immediately after the end of the first accumulation period of the signal A. Although the accumulation period changes depending on the shooting mode, the second accumulation period Tsa_B in the embodiment is set shorter than 1/60 sec corresponding to a shutter speed higher than that for a moving image. Immediately after the end of the second accumulation period of the signal B and the end of the first readout period of the signal A, the second readout period of the signal B starts. The second readout period Tsr_B of the signal B becomes longer for a larger number of pixels (larger number of rows in the pixel array) because signals are read out from all the pixels of the pixel array. The signal B is read out in the second readout period Tsr_B, output as moving image data in a period Tmv_B starting from a timing synchronized with the frame period, and output as still image data in a period Tst_B.

Similar to the signal A, the signal (first image signal) C is accumulated in a photoelectric conversion unit of each pixel on each row in the first accumulation period Tsa_C. The signal C is read out from the pixel array in the first readout period Tsr_C, and output as moving image data in a period Tmv_C starting from a timing synchronized with the frame period.

Similar to the signal B, the signal (second image signal) D is a signal of a still/moving image parallel shooting frame. The signal D is accumulated in a photoelectric conversion unit of each pixel on each row in the second accumulation period Tsa_D. The second accumulation period of the signal D starts immediately after the end of the first accumulation period of the signal C. The signal D is read out in the second readout period Tsr_D, and output as moving image data in a period Tmv_D starting from a timing synchronized with the frame period.

The length of the second accumulation period of the signal D may also be different from that of the second accumulation period of the signal B in accordance with still image shooting conditions.

At least either of the sum of the first readout period Tsr_C of the signal C and the second readout period Tsr_D of the signal D and the sum of the first accumulation period Tsa_D of the signal D and the second readout period Tsr_D of the signal D is longer than a 2-frame period. The timing when the second readout period Tsr_D of the signal D ends falls within the frame period FT106 in which the readout operation of the signal (first image signal) E is performed. For this reason, the first readout period Tsr_E of the signal E starts at a timing delayed from the start timing of the frame period FT106. In accordance with this, the timing when the first accumulation period Tsa_E of the signal E ends is also delayed from the start timing of the frame period FT106.

The start timing of the first readout period Tsr_F of the signal (first image signal) F is synchronized again with that of the frame period FT107. If the start timing of the first readout period of the signal F remains delayed from the start timing of the frame period, the start timing of the second readout period cannot be shifted before the start timing of the frame period, unlike the signals B and D, upon inserting a signal of a still/moving image parallel shooting frame later. On the contrary, by synchronizing the start timing of the readout period of the signal F again with the start timing of the frame period immediately after delaying the start timing of the readout period of a signal, the drop frame can be prevented even if the readout period of a still/moving image parallel shooting frame having a large number of pixels starts soon.

The third accumulation period Tsa_F of the signal F starts after the end of the first accumulation period Tsa_E of the signal E, and ends before the end timing of the frame period FT106. Thus, the third accumulation period Tsa_F of the signal F becomes shorter than 1/60 sec. In this case, since the accumulation period of the signal F is the third accumulation period which is shorter than the first accumulation period and shorter than the 1-frame period Tvcyc, the signal processing unit 106 increases (corrects) a gain used to amplify the signal F. The signal F is output as moving image data in a period Tmv_F starting from a timing synchronized with the frame period.

In predetermined periods Tcyc_ms1 and Tcyc_ms2 each including a plurality of frame periods in which still/moving image parallel shooting frames are inserted, driving is not synchronized with the frame period. However, after the end of these periods, driving is synchronized again with the frame period.

As described above, according to the first embodiment, even when parallel shooting of still and moving images is performedmoving image shooting, a high-resolution still image can be obtained, and the drop frame of an obtained moving image can be prevented. That is, both a high-resolution still image and retention of the moving image frame rate can be achieved when parallel shooting of still and moving images is performed.

Figure 3:
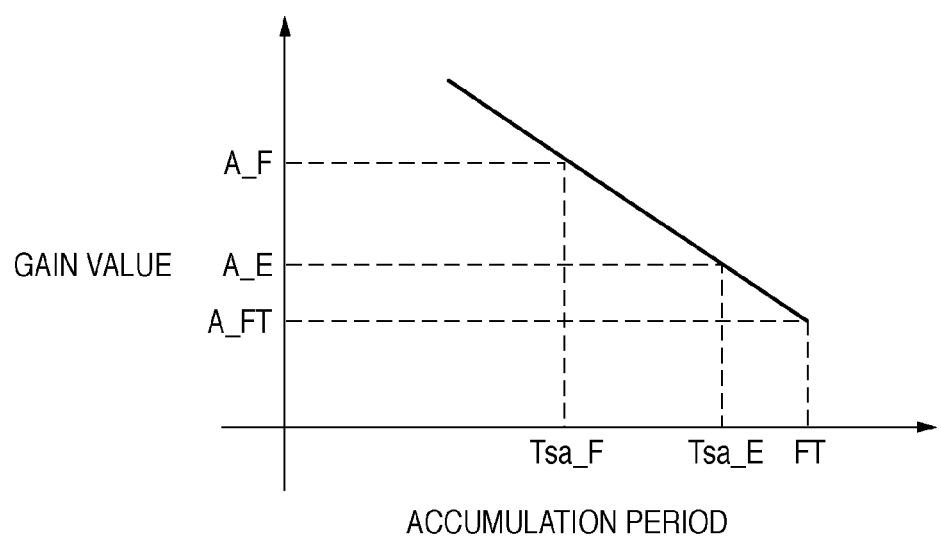
FIG. 3 is a graph showing a gain correction function used for a gain correction operation by a signal processing unit 106 in a modification to the first embodiment of the present invention.

It should be noted that the system control unit 107 may also store a gain correction function as shown in FIG. 3. When the accumulation period in the first mode becomes shorter from the first accumulation period to the third accumulation period, the system control unit 107 uses the gain correction function as shown in FIG. 3 and determines to increase a gain used when the signal processing unit 106 amplifies the signal F. The signal processing unit 106 may also execute gain correction using the determined gain.

According to the gain correction function shown in FIG. 3, when the accumulation period of a signal is FT equal to the length of the frame periods FT1 to FT9, the gain value for amplifying the signal is A_FT. According to the gain correction function shown in FIG. 3, a gain value corresponding to the accumulation period Tsa_E of the signal E is A_E, and that corresponding to the accumulation period Tsa_F of the signal F is A_F. The system control unit 107 may also determine a gain value by directly referring to the gain correction function shown in FIG. 3, or determine the gain value A_F of the signal F by referring to the gain correction function shown in FIG. 3 in accordance with the difference between the accumulation period Tsa_E of the signal E and the accumulation period Tsa_F of the signal F. That is, letting K (negative value) be the slope of the correction function shown in FIG. 3, the system control unit 107 may also determine the gain value A_F by $$A\_F = A\_E - K \times (Tsa\_E - Tsa\_F) \qquad (1)$$

The signal processing unit 106 may also adaptively control whether to generate moving image data by using an image signal corrected by the gain.

Figure 4:
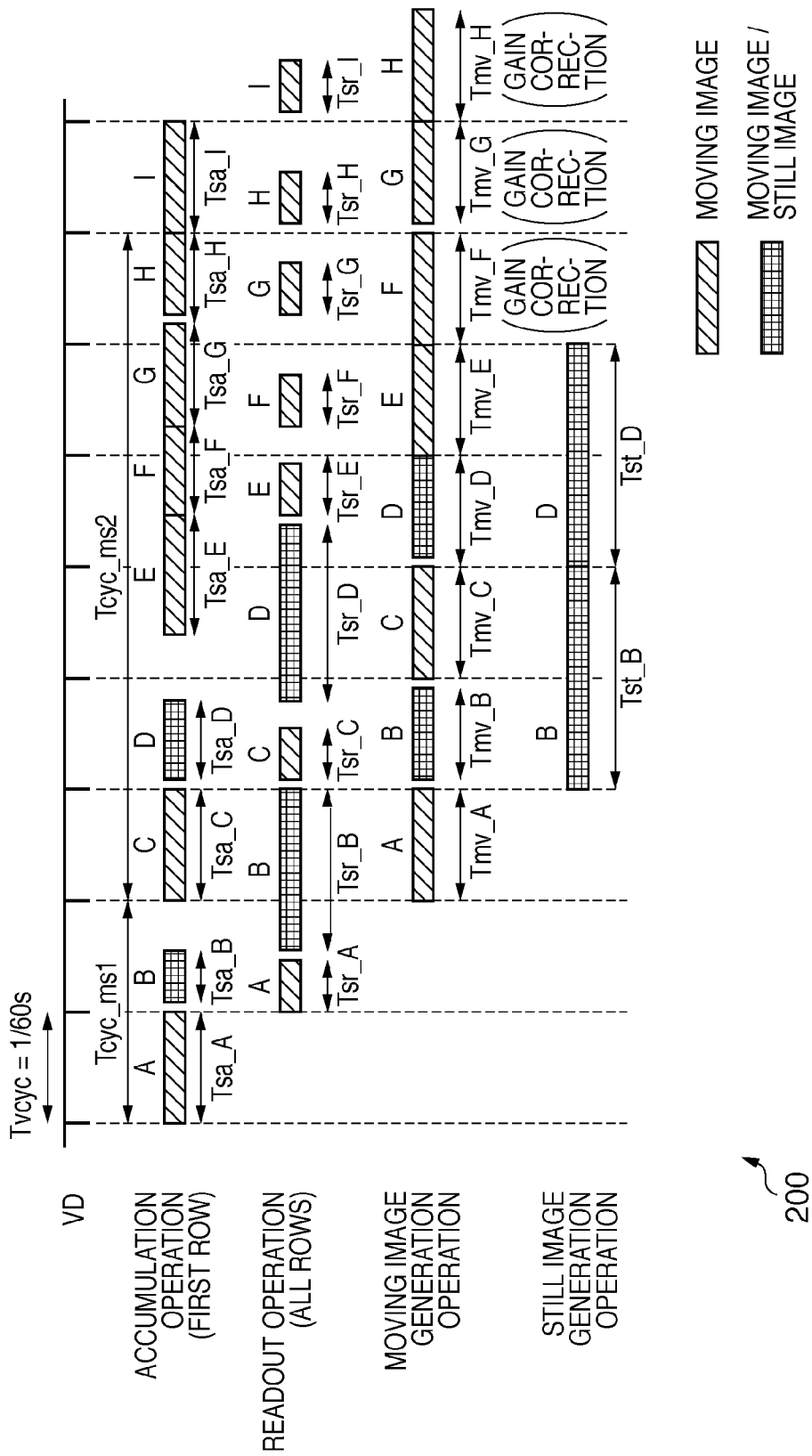
FIG. 4 is a timing chart showing the timings of an accumulation operation, readout operation, moving image generation operation, and still image generation operation in an image capturing apparatus 200 according to the second embodiment of the present invention.

An image capturing apparatus 200 according to the second embodiment of the present invention will be explained with reference to FIG. 4. FIG. 4 is a timing chart showing the timings of an accumulation operation, readout operation, moving image generation operation, and still image generation operation in the image capturing apparatus 200. An operation different from that in the first embodiment will be mainly described.

In the image capturing apparatus 200, as shown in FIG. 4, the end timings of the fourth accumulation periods Tsa_F, Tsa_G, and Tsa_H of the signals F, G, and H are gradually advanced from timings delayed from the start timing of the frame period. The fourth accumulation periods Tsa_F, Tsa_G, and Tsa_H are shorter than 1/60 sec.

In accordance with this, the start timings of the first readout periods Tsr_F and Tsr_G of the signals F and G are also gradually advanced from timings delayed from the start timing of the frame period. The start timing of the first readout period Tsr_H of the signal H almost coincides with the start timing of the frame period.

If the start timing of the first readout period of the signal H remains delayed, the start timing of the second readout period cannot be shifted before the start timing of the frame period, unlike the signal B or D, upon inserting a signal of a still/moving image parallel shooting frame later. A delayed start timing is set back over a plurality of frames F, G, and H in order to reduce the difference in accumulation period between frames and avoid an unnatural image.

In this case, since the accumulation period of the signals F, G, and H is the fourth accumulation period shorter than the first accumulation period, the signal processing unit 106 increases (corrects) a gain used to amplify the signals F, G, and H. The signals F, G, and H are output as moving image data in periods Tmv_F, Tmv_G, and Tmv_H starting from timings synchronized with the frame period.

In predetermined periods Tcyc_ms1 and Tcyc_ms2 each including a plurality of frame periods in which still/moving image parallel shooting frames are inserted, driving is not synchronized with the frame period. However, after the end of these periods, driving is synchronized again with the frame period.

An image capturing apparatus 300 according to the third embodiment of the present invention will be explained with reference to FIG. 5. FIG. 5 is a timing chart showing the timings of an accumulation operation, readout operation, moving image generation operation, and still image generation operation in the image capturing apparatus 300. An operation different from that in the first embodiment will be mainly described.

Figure 5:
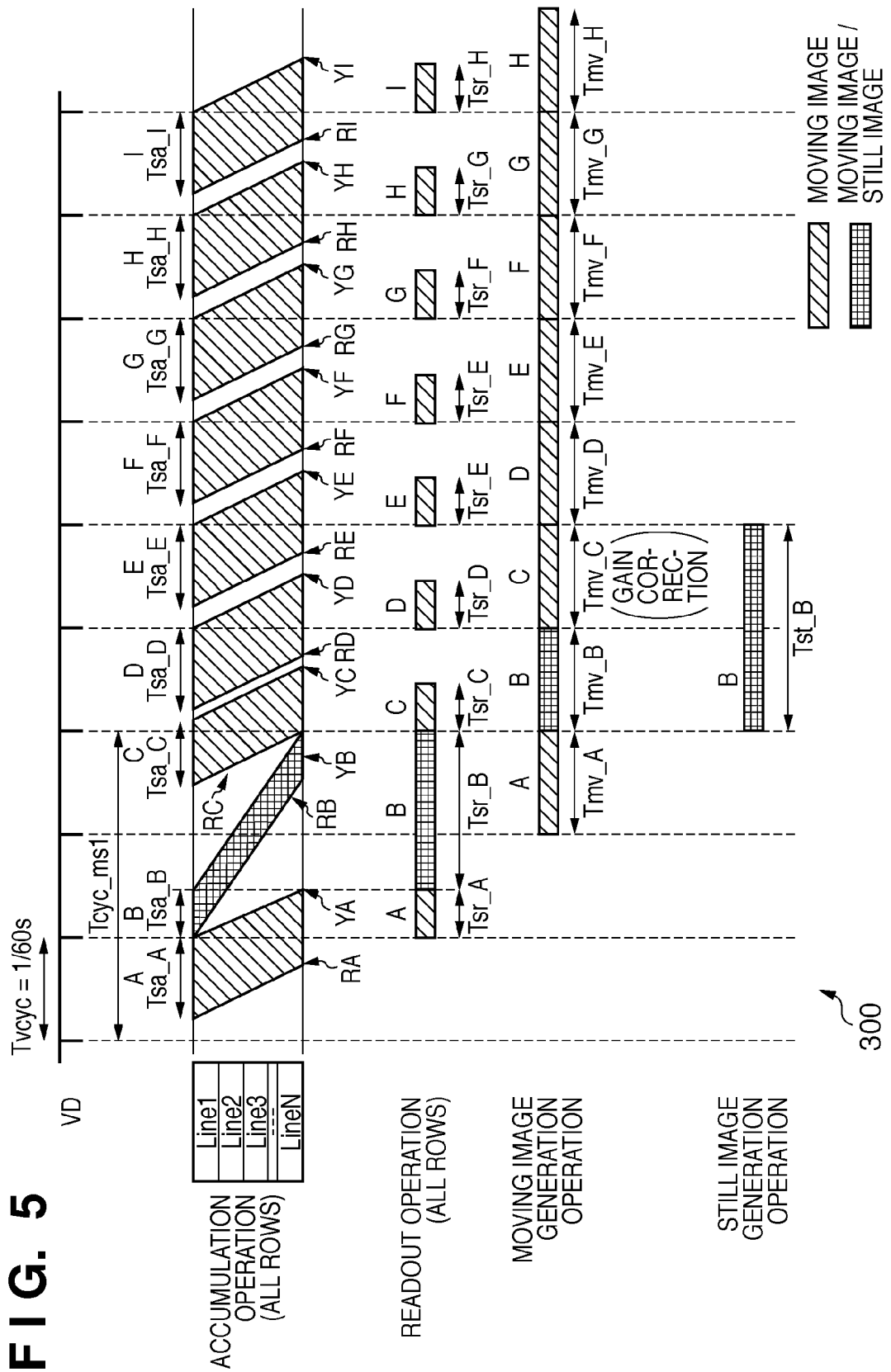
FIG. 5 is a timing chart showing the timings of an accumulation operation, readout operation, moving image generation operation, and still image generation operation in an image capturing apparatus 300 according to the third embodiment of the present invention.
Figure 6:
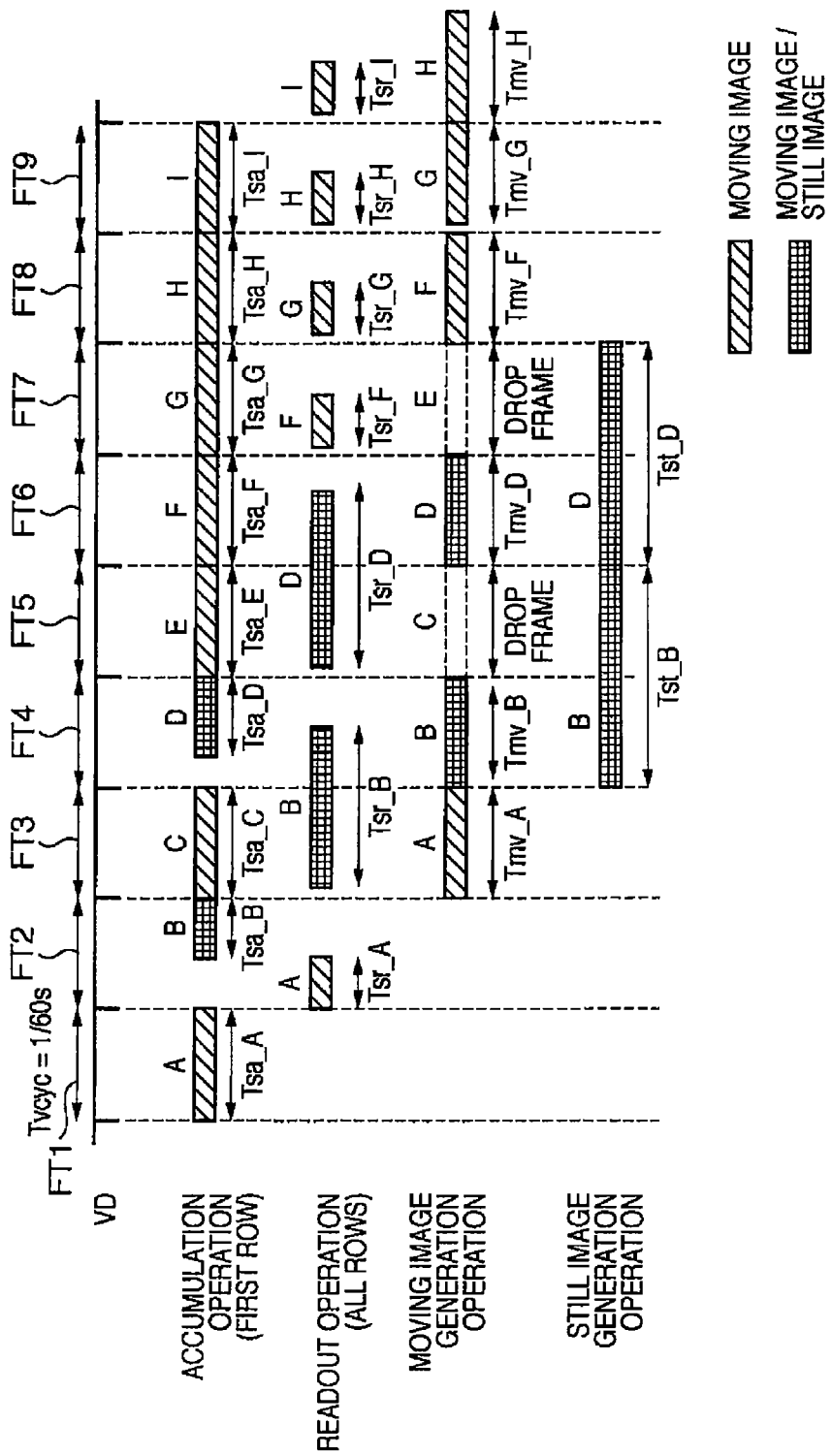
FIG. 6 is a timing chart for explaining a problem to be solved by the present invention.

In an "accumulation operation (all rows)" in FIG. 5, accumulation periods in which the photoelectric conversion units of pixels on respective rows perform an accumulation operation are represented in correspondence with the vertical positions of pixels on the respective rows. The accumulation periods of the first to $N^{th}$ rows sequentially start and sequentially end. The accumulation operations of a plurality of rows are temporally parallel-executed.

In FIG. 5, RA, RB, RC, RD, RE, RF, RG, RH, and RI represent timings when pixels on respective rows complete reset operations. YA, YB, YC, YD, YE, YF, YG, YH, and YI represent timings when readout operations are performed to read out signals from pixels on the respective rows. More specifically, the accumulation operation of a pixel on each row starts at the timing when the reset operation is completed, and ends at the timing when the readout operation starts.

The start timing of the third accumulation period Tsa_C of the signal C is delayed from the start timing of the frame period. If the third accumulation period of the signal C starts at the start timing of the frame period, a row on which the accumulation operation of the signal C starts advances, at a predetermined timing, a row on which the readout operation of the signal B is performed.

The start timing of the third accumulation period of the signal D is synchronized again with that of the frame period, similar to the signal A. This can prevent the drop frame when a still/moving image parallel shooting frame is designated next time.

In this case, since the accumulation period of the signal C is the third accumulation period shorter than the first accumulation period, the signal processing unit 106 increases (corrects) a gain used to amplify the signal C. The signal C is output as moving image data in a period Tmv_C starting from a timing synchronized with the frame period.

In a predetermined period Tcyc_ms1 including a plurality of frame periods in which still/moving image parallel shooting frames are inserted, driving is not synchronized with the frame period. However, after the end of the period, driving is synchronized again with the frame period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-046897, filed Feb. 27, 2008, which is hereby incorporated by reference herein in its entirety.

What is claimed is:

1. An image capturing apparatus comprising:
    a pixel array in which a plurality of pixels each including a photoelectric conversion unit are arrayed in a row direction and a column direction;
    a driving unit which drives the photoelectric conversion unit of each pixel of the pixel array to accumulate a signal in a first accumulation period in a first mode, and to accumulate a signal in a second accumulation period shorter than the first accumulation period in a second mode;
    a readout unit which reads out a first image signal from the pixel array in a first readout period shorter than a predetermined 1-frame period in the first mode, and reads out a second image signal from the pixel array in a second readout period longer than the 1-frame period in the second mode;
    a signal processing unit configured to generate an image for display or recording of a first frame based on the first image signal, and generate an image for display or recording of a second frame based on the second image signal; and
    a control unit which, when switching a mode from the first mode to the second mode, controls the readout unit to start a readout operation of the second image signal within a frame period in which the first image signal is read out.

2. The apparatus according to claim 1, wherein the control unit, when switching the mode from the first mode to the second mode and switching the mode back to the first mode, controls the readout unit to make a sum of the first readout period and the second readout period fit into a 2-frame period.

3. The apparatus according to claim 1, wherein the control unit, when switching the mode from the first mode to the second mode and switching the mode back to the first mode, controls the driving unit and the readout unit to make a sum of the second accumulation period and the second readout period fit into a 2-frame period.

4. The apparatus according to claim 1, wherein the control unit, when switching the mode from the first mode to the second mode and switching the mode back to the first mode, controls the readout unit to make a sum of the first readout period, the second readout period, and the next first readout period fit into a 3-frame period.

5. The apparatus according to claim 1, wherein the control unit, when switching the mode from the first mode to the second mode and switching the mode back to the first mode, controls the driving unit and the readout unit to make a sum of the second accumulation period, the second readout period, and the next first readout period fit into a 3-frame period.

6. The apparatus according to claim 1, wherein the first mode is a mode in which only moving image shooting is performed, and the second mode is a mode in which parallel shooting of still and moving images is performed.

7. A method of controlling an image capturing apparatus having a pixel array in which a plurality of pixels each including a photoelectric conversion unit are arrayed in a row direction and a column direction, the method comprising:

a driving step of driving the photoelectric conversion unit of each pixel of the pixel array to accumulate a signal in a first accumulation period in a first mode, and to accumulate a signal in a second accumulation period shorter than the first accumulation period in a second mode;

a readout step of reading out a first image signal from the pixel array in a first readout period shorter than a predetermined 1-frame period in the first mode, and reading out a second image signal from the pixel array in a second readout period longer than the 1-frame period in the second mode;

a generation step of generating an image for display or recording of a first frame based on the first image signal, and generating an image for display or recording of a second frame based on the second image signal; and a control step of, when switching a mode from the first mode to the second mode, controlling a operation in the readout step to start a readout operation of the second image signal within the frame period in which the first image signal is read out.

8. The method according to claim 7, wherein the first mode is a mode in which only moving image shooting is performed, and the second mode is a mode in which parallel shooting of still and moving images is performed.

* * * * *